2,891,062

PHENAZINE DERIVATIVES AND PREPARATION THEREOF

Joseph J. Ursprung, New London, Conn., assignor to Chas. Pfizer & Co., Brooklyn, N.Y., a corporation of Delaware No Drawing. Application July 10, 1957
Serial No. 670,877

9 Claims. (Cl. 260—267)

This application is concerned with new and useful therapeutic agents and the process by which they are prepared. More particularly, it is concerned with certain substituted and unsubstituted hydroxylated 1,2,3,4-tetrahydrophenazine-N,N'-dioxides and with the pharmaceutically acceptable acid addition salts which these compounds form with strong acids.

It has now been discovered that certain 1-hydroxy-1,2,3,4-trahydrophenazine-N,N'-dioxides; epi 1,4-dihydroxy-1,2,3,4 - tetrahydrophenazine - N,N' - dioxides; 1,4-dihydroxy-1,2,3,4-tetrahydrophenazine-N,N'-dioxides and the acid addition salts which these compounds form with acids having an ionization constant of at least $10^{-3}$ in aqueous solutions are valuable in the control of infectious organisms both in vitro and in vivo. The value of these compounds as therapeutic agents is augmented by their low toxicity particularly when compared with other agents of comparable structure which have been recommended as bacterial inhibitors. They are also useful as anthelmintic agents.

The compound 1,4-dihydroxy-1,2,3,4-tetrahydrophenazine-N,N'-dioxide which is the higher melting epimer of epi 1,4-dihydroxy-1,2,3,4-tetrahydrophenazine-N,N'-dioxide is referred to hereinafter in the present disclosure as normal 1,4-dihydroxy-1,2,3,4-tetrahydrophenazine-N,N'-dioxide. This is done merely to facilitate the language and no inference is intended as to the absolute configuration of the various atoms in the molecules.

The free bases of the instant invention are prepared by the action of a perorganic acid such as performic, perbenzoic or preferably peracetic acid on a 1,2,3,4-tetrahydrophenazine which in turn can be prepared by the method of Clemo and McIlwain as described in the Journal of The Chemical Society 1934, page 1991.

In carrying out the reaction a 1,2,3,4-tetrahydrophenazine is contacted with from about a 0.5 to about a 2.0 molar proportion of a perorganic acid. The perorganic acid can be prepared in situ by adding hydrogen peroxide to the tetrahydrophenazine dissolved in an organic acid, for example, to formic, benzoic or acetic acid or alternatively, and most conveniently these acids can be prepared externally and utilized in this form. A most convenient solution is the 40% peracetic acid of commerce. The tetrahydrophenazine and perorganic acid are maintained in contact with each other at from about 15° C. to about 65° C. for at least a day to obtain satisfactory yields, although some product is undoubtedly formed in a shorter time. Temperatures above the disclosed range are not to be desired since there is danger of decomposition of the reaction mixture. The optimum period of the reaction varies considerably with the product which it is desired to prepare. It is usually found that, if the reaction period is from about 1 to about 2½ days and if the temperature is maintained below 35° C., the principal product is the monohydroxy compound. Above this time, and utilizing temperatures above 45° C., the usual product is a mixture of the normal and the epi dihydroxy compounds. It is generally not necessary to run the reaction for more than six days to prepare the dihydroxy compounds although this is not critical. At intermediate temperatures and times the reaction gives a mixture containing varying proportions of each antimicrobial agent.

At the end of the reaction period, the solution is concentrated to from about 20 to about 50% of its original volume and about an equal volume of water is added. The solution is then neutralized with an alkaline reagent, for example, an hydroxide, carbonate or bicarbonate of an alkali metal or alkaline earth metal. The desired product is isolated from the alkaline solution by extraction with an inert water-immiscible organic solvent. Aliphatic and aromatic halogenated hydrocarbon solvents are useful for this purpose. Suitable solvents include benzene, chlorobenzene, chloroform, carbon tetrachloride, bromobenzene, methylene chloride, ethylene chloride, etc. The reaction product either as a single product or as a mixture or products is most conveniently recovered from the extraction solvent by removal of the solvent in vacuo usually after the solution has been dried over an anhydrous drying agent.

Mixtures of the compounds of this invention are useful in the treatment of various pathological conditions. If it is desired, however, the mixture can be separated by the usual means employed for such separations. If only a monohydroxyl derivative is prepared, it is best to utilize the preferred conditions for this preparation; however, if the intermediate conditions are employed and a mixture of mono and dihydroxylated derivatives is obtained, the monohydroxylated derivative can be separated from the dihydroxylated derivatives by chromatographic separation on an alumina column using halogenated aliphatic hydrocarbon solvents and alkanols as the eluting agent. This method is more fully illustrated in the appended examples. Other solvents or solvent systems, for example, ethyl acetate-chloroform, chlorobenzene-benzene, benzene-chloroform, etc. can also be employed.

If the reaction conditions are such that a mixture of dihydroxylated derivatives is obtained, these are most conveniently separated by fractional crystallization. Thus, it has been found that epi 1,4-dihydroxy-1,2,3,4-tetrahydrophenazine-N,N'-dioxide is less soluble in water than is the normal compound. A mixture of these compounds can, therefore, be separated by dissolving the mixture in at least 60 times its weight of boiling water and cooling. The epi compound crystallizes out of the cooled solution. The normal compound remains in solution and can be isolated by removing the solvent in vacuo. It has also been found that the normal compound is less soluble in acetone and various other oxygenated lower aliphatic solvents such as the alkanols than is the epi compound. The pure normal compound can, therefore, be readily obtained by dissolving the mixture in at least 140 times its weight in boiling acetone or similar solvent and cooling. The normal compound precipitates from solution and the epi compound remains in solution to be isolated by removing the solvent in vacuo.

A more convenient method of isolating the normal compound is to dissolve the mixture in about 60 times its weight of boiling lower aliphatic halogenated hydrocarbon solvent. A lower oxygenated aliphatic solvent of the type described above is then added to the boiling solution in a manner so as to gradually replace the halogenated hydrocarbon solvent to leave a solution consisting of the normal and the epi dihydroxylated tetrahydrophenazines in the lower oxygenated organic solvent. The normal compound precipitates from this solvent on cooling. In this manner it is possible to utilize smaller amounts of the oxygenated solvent, say up to 40 times the weight of the mixture. It should be noted that the oxygenated solvent selected should boil under normal conditions at a higher temperature than the halogenated hydrocarbon solvent so as to permit convenient removal of the latter by distillation.

These methods are more fully illustrated in the appended examples.

The free bases have an extremely low basicity, and for the preparation of pharmaceutically acceptable acid addition salts, it is necessary to use relatively strong acids, preferably those having an ionization constant of at least $10^{-3}$ in aqueous solution. An ionization constant of this order is generally only available from inorganic acids such as hydrochloric, hydrobromic, hydriodic, sulfuric, nitric, phosphoric, etc. but certain organic acids, notably maleic and certain sulfonic acids such as ethanedisulfonic acid also have an ionization constant of this order. As stated above, it is intended to include within the purview of the instant invention those pharmaceutically acceptable acid addition salts which the hydroxylated free bases form with free acids. Pharmaceutically acceptable acid addition salts are readily prepared by procedures well known to those skilled in the art. One very convenient method for the preparation of these salts is to dissolve the free acid in an anhydrous solvent and treat the solution with an anhydrous acid, for example, hydrochloric or hydrobromic acid. The acid addition salt will generally precipitate or it can be obtained by evaporation of the solvent in vacuo.

Another highly useful method for converting one acid addition salt to another acid addition salt comprises contacting the original salt with a basic anion exchange resin. A highly basic resin such as the product available from Rohm & Haas Company under the trade name Amberlite IRA–400 is especially suitable. It is employed in the acid form. The resin itself is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the sulfuric acid salt, the resin is first contacted with an aqueous solution of sulfuric acid whereupon an anion exchange takes place converting the quaternary halide to the acid addition salt. The acid resin is then contacted with other acid addition salts of this the quaternary halide to the acid addition salts of this invention, for example, the hydrobromide and a further anion exchange takes place converting the hydrobromide acid addition salt to the sulfate acid addition salt and converting the resin to the hydrobromide. The sulfuric acid addition salt can be recovered from the eluate by a number of methods such as evaporation or solvent precipitation.

Substituted 1-monohydroxylated - 1,4 - dihydroxylated- and epi 1,4-dihydroxylated-1,2,3,4-tetrahydrophenazine-N,N'-dioxides wherein the substituents are selected from the group consisting of chlorine, bromine and iodine atoms, nitro and cyano groups and alkyl and alkoxy groups, said alkyl and alkoxy groups containing up to four carbon atoms are also useful anti-infective agents. It is especially intended to include these substituted compounds, as well as the acid addition salts which they form with acids having an ionization constant of at least $10^{-3}$, within the purview of the instant invention. The substituents on a particular compound may be the same or different and a particular substituent may be on any position on the tetrahydrophenazine nucleus having a replaceable hydrogen and not already substituted with an hydroxyl group. These include the 2,3,4,5,6,7 and 8 positions on a monohydroxylated compound and the 2,3,5,6,7 and 8 positions on a dihydroxylated compound. Preferred species include those containing up to four substituents since these are generally less expensive to prepare.

As stated above, the compounds of this invention are anti-infective agents, particularly valuable in combating infectious microorganisms responsible for pathological conditions of plants and animals including humans. The following example is illustrative of their particular effectiveness in combating infectious organisms. A strain of *Proteus vulgaris* which is typical of the gram-negative microorganisms responsible for many pathological conditions, particularly refractory infections of the urinary tract was isolated from a clinical case. It was grown in a brain-heart infusion medium and treated with normal 1,4-dihydroxy-1,2,3,4-tetrahydrophenazine-N,N'-dioxide in the form of the free base. It was found that the minimum inhibitory concentration (MIC) was only 25 micrograms per milliliter (Mcg./ml.). Similar results were obtained with the analogous monohydroxy compound and the epi dihydroxy compound each as the free base, and with all three of these compounds in the form of acid addition salts.

The following example is illustrative of the utility of the compounds of the instant invention in the treatment of infections microorganisms in vivo. An experimentally significant number of mice were injected with a normally lethal dose of a strain of *Proteus vulgaris* and tests were run to determine the effectiveness of the various dosage levels of normal 1,4-dihydroxy-1,2,3,4-tetrahydrophenazine-N,N'-dioxide as the free base. It was found that at a dosage level of 50 mg./kg. of body weight 93% of the animals survived the infection. At 100 mg./kg. 97% of the animals survived the infection and at 200 and 400 mg./kg. 100% of the animals survived the infection. This last test is illustrative of the low toxicity of this compound as well as its efficacy as a bacterial inhibitor. Similar results are found with the other compounds of this invention, both as free bases and as acid addition salts. Mixtures containing varying proportions of the compounds of this invention either as free bases or as acid addition salts were also successfully utilized in similar tests.

The compounds of this invention, either as individual therapeutic agents or as mixtures of therapeutic agents, may be administered alone but are generally administered with a pharmaceutical carrier selected on the basis of the chosen route of administration and standard pharmaceutical practice. For example, they may be administered orally in the form of tablets or capsules containing such excipients as starch, milk sugar or certain types of clay, etc. They may be administered orally in the form of elixirs or oral suspensions which may contain a coloring or flavoring agent. They may be injected parenterally and for this use they may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The physician or veterinarian will determine the dosage which will be most suitable for a particular application and it will generally depend on the age, weight, degree of infection and other factors of a particular patient. It will generally be found that when a drug is administered orally a larger quantity will be required to produce the same anti-infective effect as a smaller quantity given parenterally. The compounds are useful in the same manner as other antimicrobial agents and the dosage level is of the same order of magnitude as is generally employed with these other antimicrobial agents. For a particular application it may be found that because of their high order of activity smaller dosages of the compounds of this invention are required to bring about the same effect as other and less active anti-infective agents.

The compositions of this invention may take a variety of forms. Various diluents may be employed and the percentage of active ingredients may be varied. It is necessary that the active ingredients form a proportion of the composition such that a suitable dosage form will be obtained. Obviously several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The composition may contain 10, 50, 75, 95 or an even higher percentage by weight of the active agent. Dosage unit forms may be prepared with a minor proportion of the carrier and a larger proportion of active materials and vice versa.

The following examples are given solely for the purpose of illustration and are not to be construed as limitations of this invention, many apparent variations of which are possible without departing from the spirit or scope thereof.

EXAMPLE I

*Normal 1,4-dihydroxy-1,2,3,4-tetrahydrophenazine-N,N'-dioxide*

Twenty grams (20 g.) of 1,2,3,4-tetrahydrophenazine in 125 cc. of 40% peracetic acid was maintained at a temperature of 50 to 55° C. for three days. At the end of this period the solution was concentrated in vacuo to a volume of 20 cc. and 20 cc. of water was added. The solution was made slightly alkaline with 10% sodium hydroxide. It was extracted several times with 25 cc. portions of methylene chloride and the combined methylene chloride extracts dried over anhydrous sodium sulfate. The solution was filtered and the solvent removed in vacuo. The residue was taken up in 60 times its weight of boiling methylene chloride. The methylene chloride was gradually boiled away and replaced with acetone by the gradual addition of this reagent. The final boiling solution contained the residue dissolved in about 40 times its weight of acetone. The solution was cooled and the desired product isolated by filtration; M.P. 171 to 172° C.

Analysis.—Calc'd for $C_{12}H_{12}N_2O_4$: C, 58.06; H, 4.87; N, 11.29. Found: C, 58.07; H, 4.82; N, 10.70.

EXAMPLE II

*Epi 1,4-dihydroxy-1,2,3,4-tetrahydrophenazine-N,N'-dioxide*

Twenty grams (20 g.) of 1,2,3,4-tetrahydrophenazine in 125 cc. of 40% peracetic acid was maintained at a temperature of 50 to 55° C. for six days. At the end of this period the solution was concentrated in vacuo to a volume of 20 cc. and 20 cc. of water was added. The solution was made slightly alkaline with 10% sodium hydroxide. The solution was extracted several times with 25 cc. portions of methylene chloride and the combined methylene chloride extracts dried over anhydrous sodium sulfate. The solution was filtered and the solvent removed in vacuo. The residue was taken up in 60 times its weight of boiling water. The solution was cooled and the desired product precipitated and was recovered by filtration; M.P. 167° C. to 168° C.

Analysis.—Calc'd for $C_{12}H_{12}N_2O_4$: C, 58.06; H, 4.87; N, 11.29. Found: C, 58.07; H, 4.82; N, 10.70.

EXAMPLE III

Epi 1,4-dihydroxy-1,2,3,4-tetrahydrophenazine-N,N'-dioxide was recovered from the acetone filtrate of Example I by removing the acetone in vacuo and recrystallizing the residue in boiling water. Normal 1,4-dihydroxy-1,2,3,4-tetrahydrophenazine-N,N'-dioxide was recovered from the filtrate of Example II by removing the solvent in vacuo and recrystallizing the residue in acetone.

EXAMPLE IV

*Normal 1,4-dihydroxy-1,2,3,4-tetrahydrophenazine-N,N'-dioxide*

One mole of 1,2,3,4-tetrahydrophenazine was dissolved in 2.0 moles of performic acid and the mixture maintained at a temperature of 45° for four days. At the end of this period the excess peracid was decomposed by the addition of water and the solution made slightly alkaline with 10% sodium carbonate. It was extracted with chloroform and the organic solution dried over anhydrous sodium sulfate. The solution was filtered and concentrated in vacuo. The residue was recovered by filtration and taken up in 120 times its weight of acetone. The acetone solution was concentrated to about 40% of its original volume, cooled and the desired product precipitated.

The procedure was repeated except that the acetone was replaced with ethanol and the desired product was recovered.

EXAMPLE V

*Epi 1,4-dihydroxy-1,2,3,4-tetrahydrophenazine-N,N'-dioxide*

One mole of 1,2,3,4-tetrahydrophenazine in 0.5 mole of 30% perbenzoic acid was maintained at a temperature of 60 to 65° for three days. At the end of this period the solution was concentrated to about one-fifth of its original volume in vacuo and an equal amount of water was added. It was made slightly alkaline with 10% sodium hydroxide and extracted with ethylene chloride. The ethylene chloride solution was dried over anhydrous sodium sulfate, filtered and the solvent removed in vacuo. The residue was taken up in 70 times its weight of boiling water, cooled and the desired product precipitated.

EXAMPLE VI

*1-hydroxy-1,2,3,4-tetrahydrophenazine-N,N'-dioxide*

Twenty grams (20 g.) of 1,2,3,4-tetrahydrophenazine in 125 cc. of 40% peracetic acid was maintained at 20 to 25° C. for three days. The solution was concentrated to a volume of 20 cc. and 20 cc. of water was added. It was made slightly alkaline with 10% sodium hydroxide and extracted several times with 25 cc. portions of methylene chloride. The organic solution was dried over anhydrous sodium sulfate, filtered and the filtrate passed over an alumina column. The column was eluted first with methylene chloride, and then with a 1:1 mixture of chloroform-methanol. The chloroform-methanol eluate was evaporated in vacuo to give a residue of the desired product. It was recrystallized from chloroform-methanol; M.P. 175° to 176° C.

Analysis.—Calc'd for $C_{12}H_{12}N_2O_3$: C, 62.06; H, 5.21; N, 12.06. Found: C, 62.17; H, 5.25; N, 12.16.

EXAMPLE VII

*Normal 1,4-dihydroxy-1,2,3,4-tetrahydrophenazine-N,N'-dioxide hydrochloride*

Anhydrous hydrogen chloride was bubbled into 50 cc. of anhydrous chloroform containing 5 g. of normal 1,4-dihydroxy-1,2,3,4-tetrahydrophenazine-N,N'-dioxide and the hydrochloride of the free base precipitated. It was recovered by filtration.

EXAMPLE VIII

*Epi 1,4-dihydroxy-1,2,3,4-tetrahydrophenazine-N,N'-dioxide hydrobromide*

Anhydrous hydrogen bromide was bubbled into 50 cc. of anhydrous ether containing 5 g. of epi 1,4-dihydroxy-1,2,3,4-tetrahydrophenazine-N,N'-dioxide and the hydrobromide of the free base precipitated. It was recovered by filtration.

EXAMPLE IX

*Normal 1,4-dihydroxy-1,2,3,4-tetrahydrophenazine-N,N'-dioxide sulfate*

A 15% aqueous solution of normal 1,4-dihydroxy-1,2,3,4-tetrahydrophenazine-N,N'-dioxide hydrochloride was stirred for three hours with an anion exchange resin which had been washed previously with aqueous sulfuric acid. The resin was removed by filtration and the solvent removed in vacuo to leave the sulfuric acid addition salt as a residue.

Included among the anion exchange resins which were successfully employed with this process were Amberlite IRA–410 and Amberlite IRA–400 available from Rohm & Haas Company and also Dowex–1 and Dowex–2 available from the Dow Chemical Company.

A number of other acid addition salts of both this compound, the epi compound and the monohydroxylated compound were prepared using this procedure. These included the nitrate, the hydriodide, the phosphate and the sulfate acid addition salts.

EXAMPLE X

A strain of *Salmonella newington* was grown in a nutrient broth containing brain-heart infusion medium. The broth was treated with normal 1,4-dihydroxy-1,2,3,4-tetrahydrophenazine-N,N'-dioxide and the MIC determined. It was found to be only 12.5 mcg. Similar results were obtained with epi 1,4-dihydroxy-1,2,3,4-tetrahydrophenazine-N,N'-dioxide.

EXAMPLE XI

A strain of *Escherichia coli* was grown in a nutrient broth containing commercial brain-heart infusion medium. It was treated with normal 1,4-dihydroxy-1,2,3,4-tetrahydrophenazine-N,N'-dioxide and the MIC determined. It was found to be only 12.5 mcg. Similar results were obtained with epi 1,4-dihydroxy-1,2,3,4-tetrahydrophenazine-N,N'-dioxide.

EXAMPLE XII

Mice weighing from 11 to 15 g. were separated into groups and infected by intraperitoneal injection with a normally lethal dosage of suspensions of *Pasteurella multocida*. Each group was treated with a different level of normal 1,4-dihydroxy-1,2,3,4-tetrahydrophenazine-N,N'-dioxide to determine the number of survivors at each level. It was found that at a dosage level of 200 mg./kg. of body weight 87% of the animals survived the infection and at 400 mg./kg. 100% of the animals survived.

These experiments were repeated using 1-hydroxy-1,2,3,4-tetrahydrophenazine-N,N'-dioxide; epi 1,4-dihydroxy-1,2,3,4-tetrahydrophenazine-N,N'-dioxide, each as the free base, the hydrochloride or the sulfate and similar results were obtained.

All of the compounds were identically tested with mice infected with *Pseudomonas aeruginsosa* or with *Micrococcus pyogenes var. aureus* and similar results were obtained.

EXAMPLE XIII

A tablet base is prepared by blending the following ingredients in the proportion by weight indicated.

| | Grams |
|---|---|
| Sucrose U.S.P. | 82.0 |
| Tapioca starch | 13.6 |
| Magnesium stearate | 4.4 |

Into this tablet base there is blended a sufficient amount of normal 1,4-dihydroxy-1,2,3,4-tetrahydrophenazine-N,N'-dioxide to provide tablets each containing 25 mg. active ingredient.

EXAMPLE XIV

Into the tablet base of Example XIII there is blended a sufficient amount of 1-hydroxy-1,2,3,4-tetrahydrophenazine-N,N'-dioxide to provide tablets each containing 0.5 mg. of active ingredient.

EXAMPLE XV

A tablet base is prepared by blending the following ingredients:

| | Grams |
|---|---|
| Calcium carbonate U.S.P. | 17.60 |
| Dicalcium sulfate | 18.80 |
| Magnesium trisilicate U.S.P. | 5.20 |
| Lactose U.S.P. | 5.20 |
| Potato starch | 5.20 |
| Epi 1,4 - dihydroxy - 1,2,3,4 - tetrahydrophenazine-N,N'-dioxide | 4.00 |
| Magnesium stearate A | 0.80 |
| Magnesium stearate B | 0.32 |

The blend is divided and formed into tablets each containing 50 mg. of active ingredient.

EXAMPLE XVI

Into the tablet base of Example XIV there is blended a sufficient amount of 1-hydroxy-1,2,3,4-tetrahydrophenazine-N,N'-dioxide to provide tablets each containing 1 mg. of active ingredient.

EXAMPLE XVII

An aqueous solution containing 0.005% by weight of normal 1,4-dihydroxy-1,2,3,4-tetrahydrophenazine-N,N'-dioxide hydrochloride is prepared by dissolving the sulfate in U.S.P. distilled water.

EXAMPLE XVIII

Sesame oil is sterilized by heating at 125° C. for two hours. To this oil there is added a sufficient amount of pulverized epi 1,4-dihydroxy-1,2,3,4-tetrahydrophenazine-N,N'-dioxide sulfate to make a 0.025% suspension by weight. The solid is thoroughly dispersed in the oil with the aid of a colloid mill. It is then filtered through a 100 to 150 mesh screen and poured into sterile vials.

EXAMPLE XIX

*1-hydroxy-1,2,3,4-tetrahydrophenazine-N,N'-dioxide*

Ten grams (10 g.) of 1,2,3,4-tetrahydrophenazine in 70 cc. of 40% peracetic acid was maintained at 20° C. for 1½ days. The solution was then concentrated to a volume of 15 cc. and 20 cc. of water was added. It was made slightly alkaline with dilute sodium carbonate solution and extracted three times with 20 cc. portions of chloroform. The organic solution was washed with water, dried over anhydrous sodium sulfate, filtered and the solvent removed in vacuo. The residue was recrystallized from chloroform-methanol; M.P. 175° to 176° C.

EXAMPLE XX

*Normal 2,3-dichloro-1,4-dihydroxy-1,2,3,4-tetrahydrophenazine-N,N'-dioxide*

Twenty grams (20 g.) of 2,3-dichloro-1,2,3,4-tetrahydrophenazine in 125 cc. of 40% peracetic acid was maintained at a temperature of 50° to 55° C. for three days. At the end of this period, the solution was concentrated in vacuo to a volume of 20 cc. and an equal volume of water was added. The solution was made slightly alkaline with 10% sodium hydroxide. It was extracted several times with 25 cc. portions of methylene chloride and the combined methylene chloride extracts dried over anhydrous sodium sulfate. The solution was filtered and the solvent removed in vacuo. The residue was taken up in sixty times its weight of boiling methylene chloride. The methylene chloride was gradually boiled away and replaced with acetone by the gradual addition of this reagent. The final boiling solution contained the residue dissolved in about forty times its weight of acetone. The solution was cooled and the desired product isolated by filtration.

EXAMPLE XXI

*Epi 2,3,6,7-tetrachloro-1,4-dihydroxy-1,2,3,4-tetrahydrophenazine-N,N'-dioxide*

Twenty grams (20 g.) of 2,3,6,7-tetrachloro-1,2,3,4-tetrahydrophenazine in 125 cc. of 40% peracetic acid was maintained at a temperature of 50 to 55° C. for six days. At the end of this period the solution was concentrated in vacuo to a volume of 20 cc. and an equal volume of water was added. The solution was made slightly alkaline with 10% sodium hydroxide. The solution was extracted several times with 25 cc. portions of methylene chloride and the combined methylene chloride extracts dried over anhydrous sodium sulfate. The solution was filtered and the solvent removed in vacuo. The residue was taken up in sixty times its weight of boiling water. The solution was cooled, the desired product precipitated and was recovered by filtration.

EXAMPLE XXII

*Normal 6,7-dimethoxy-1,4-dihydroxy-1,2,3,4-tetrahydrophenazine-N,N'-dioxide*

One mole of 6,7-dimethoxy-1,2,3,4-tetrahydrophenazine was dissolved in 2.0 moles of performic acid and the mixture maintained at a temperature of 45° C. for four days. At the end of this period the excess peracid was decomposed by the addition of water and the solution made slightly alkaline with 10% sodium carbonate. It was extracted with chloroform and the organic solution dried over anhydrous sodium sulfate. The solution was filtered and concentrated in vacuo. The residue was recovered by filtration and taken up in 120 times its weight of acetone. The acetone solution was concentrated to about 40% of its original volume, cooled and the desired product precipitated.

EXAMPLE XXIII

*Epi 2,3,5-tripropoxy-1,4-dihydroxy-1,2,3,4-tetrahydrophenazine-N,N'-Dioxide*

One mole 2,3,5-tripropoxy-1,2,3,4-tetrahydrophenazine in 0.5 mole of 30% perbenzoic acid was maintained at a temperature of 60 to 65° C. for three days. At the end of this period the solution was concentrated to about one-fifth of its original volume in vacuo and an equal amount of water was added. It was made slightly alkaline with 10% sodium hydroxide and extracted with ethylene chloride. The ethylene chloride solution was dried over anhydrous sodium sulfate, filtered and the solvent removed in vacuo. The residue was taken up in 70 times its weight of boiling water, cooled, and the desired product precipitated.

EXAMPLE XXIV

*Normal 2-butyl-1,4-dihydroxy-1,2,3,4-tetrahydrophenazine-N,N'-dioxide*

Twenty grams (20 g.) of 2-butyl-1,2,3,4-tetrahydrophenazine in 125 cc. of 40% peracetic acid was maintained at a temperature of 50 to 55° C. for three days. At the end of this period the solution was concentrated in vacuo to a volume of 20 cc. and an equal volume of water was added. The solution was made slightly alkaline with 10% sodium hydroxide. It was extracted several times with 25 cc. portions of methylene chloride and the combined methylene chloride extracts dried over anhydrous sodium sulfate. The solution was filtered and the solvent removed in vacuo. The residue was taken up in sixty times its weight of boiled methylene chloride. The methylene chloride was gradually boiled away and replaced with acetone by the gradual addition of this reagent. The final boiling solution contained the residue dissolved in about forty times its weight of acetone. The solution was cooled and the desired product isolated by filtration.

EXAMPLE XXV

*Epi 2,5-dinitro-1,4-dihydroxy-1,2,3,4-tetrahydrophenazine-N,N'-dioxide*

Twenty grams (20 g.) of 2,5-dinitro-1,2,3,4-tetrahydrophenazine in 125 cc. of 40% peracetic acid was maintained at a temperature of 50 to 55° C. for six days. At the end of this period the solution was concentrated in vacuo to a volume of 20 cc. and an equal volume of water was added. The solution was made slightly alkaline with 10% sodium hydroxide. It was extracted several times with 25 cc. portions of methylene chloride and the combined extracts dried over anhydrous sodium sulfate. The solution was filtered and the solvent removed in vacuo. The residue was taken up in sixty times its weight of boiling water. The solution was cooled, the desired product precipitated and was recovered by filtration.

EXAMPLE XXVI

*Normal 2,5-dicyano-1,4-dihydroxy-1,2,3,4-tetrahydrophenazine-N,N'-dioxide*

One mole of 2,5-dicyano-1,2,3,4-tetrahydrophenazine was dissolved in 2.0 moles of performic acid and the mixture maintained at a temperature of 45° C. for four days. At the end of this period the excess peracid was decomposed by the addition of water and the solution was made slightly alkaline with 10% sodium carbonate. It was extracted with chloroform and the organic solution dried over anhydrous sodium sulfate. The solution was filtered and concentrated in vacuo. The residue was recovered by filtration and taken up in 120 times its weight of acetone. The acetone solution was concentrated to about 40% its original volume, cooled and the desired product precipitated.

EXAMPLE XXVII

*Epi 2-chloro-8-iodo-1,4-dihydroxy-1,2,3,4-tetrahydrophenazine-N,N'-dioxide*

One mole of 2-chloro-8-iodo-1,2,3,4-tetrahydrophenazine in 0.5 mole of 30% perbenzoic acid was maintained at a temperature of 60 to 65° C. for three days. At the end of this period the solution was concentrated to about one-fifth its original volume in vacuo and an equal amount of water was added. It was made slightly alkaline with 10% sodium hydroxide and extracted with ethylene chloride. The organic solution was dried over anhydrous sodium sulfate, filtered and the solvent removed in vacuo. The residue was taken up in 70 times its weight of boiling water, cooled and the desired product precipitated.

EXAMPLE XXVIII

*2,3,4-tribromo-1-hydroxy-1,2,3,4-tetrahydrophenazine-N,N'-dioxine*

Twenty grams (20 g.) of 2,3,4-tribromo-1,2,3,4-tetrahydrophenazine in 125 cc. of 40% peracetic acid was maintained at 20 to 25° C. for three days. The solution was concentrated to a volume of 20 cc. and an equal volume of water was added. It was made slightly alkaline with 10% sodium hydroxide and extracted several times with 25 cc. portions of methylene chloride. The organic solution was washed with water, dried over anhydrous sodium sulfate, filtered and the desired product recovered by removal of the solvent in vacuo.

EXAMPLE XXIX

*2,3,8-tripropoxy-1-hydroxy-1,2,3,4-tetrahydrophenazine-N,N'-dioxide*

Ten grams (10 g.) of 2,3,8-tripropoxy-1,2,3,4-tetrahydrophenazine in 70 cc. of 30% perbenzoic acid was maintained at 25° C. for two days. The solution was then concentrated to a volume of 15 cc. and an equal volume of water was added. It was made slightly alkaline with dilute sodium carbonate solution and extracted three times with 20 cc. portions of chloroform. The organic solution was washed with water, dried over anhydrous sodium sulfate, filtered and the desired product recovered by removal of the solvent in vacuo.

EXAMPLE XXX

*2-nitro-1-hydroxy-1,2,3,4-tetrahydrophenazine-N,N'-dioxide*

Ten grams (10 g.) of 2-nitro-1,2,3,4-tetrahydrophenazine in 70 cc. of performic acid was maintained at 25° C. for one day. The solution was concentrated to a volume of 20 cc. and an equal volume of water was added. It was made slightly alkaline with dilute sodium hydroxide solution and extracted three itmes with 20 cc. portions of chloroform. The organic solution was washed with water, dried over anhydrous sodium sulfate, filtered and the desired product recovered by removal of the solvent in vacuo.

EXAMPLE XXXI

*3-cyano-1-hydroxy-1,2,3,4-tetrahydrophenazine-N,N'-dioxide*

Ten grams (10 g.) of 3-cyano-1,2,3,4-tetrahydrophenazine in 70 cc. of 40% peracetic acid was maintained at 20° C. for one-and-a-half days. The solution was concentrated to a volume of 20 cc. and an equal volume of water was added. It was made slightly alkaline with dilute potassium carbonate solution and extracted three times with 20 cc. portions of methylene chloride. The organic solution was washed with water, dried over anhydrous magnesium sulfate, filtered and the desired product recovered by removal of the solvent in vacuo.

EXAMPLE XXXII

*2-nitro-6,7-dibromo-1-hydroxy-1,2,3,4-tetrahydrophenazine-N,N'-dioxide*

Ten grams (10 g.) of 2-nitro-6,7-dibromo-1,2,3,4-tetrahydrophenazine in 70 cc. of 40% peracetic acid was maintained at 20° C. for two days. The solution was concentrated to a volume of 20 cc. and an equal volume of water was added. It was made slightly alkaline with dilute sodium carbonate solution and extracted three times with 20 cc. portions of ethylene chloride. The organic solution was washed with water, dried over anhydrous sodium sulfate, filtered and the desired product recovered by removal of the solvent in vacuo.

EXAMPLE XXXIII

The hydrochloride salts of the free bases prepared in accordance with the directions given in Examples XXI to XXXII were each prepared by taking up 5 g. of the free base in 50 cc. of anhydrous chloroform and bubbling in an excess of hydrogen chloride. The hydrochloride salt precipitated and was recovered by filtration.

What is claimed is:

1. A compound selected from the group consisting of substituted and unsubstituted 1-monohydroxylated-, 1,4-dihydroxylated-, and epi 1,4-dihydroxylated-1,2,3,4-tetrahydrophenazine-N,N'-dioxides and the pharmaceutically acceptable acid addition salts of the acids of said N,N'-dioxides, said acid addition salts having an ionization constant of at least $10^{-3}$ in aqueous solution; the substituted dioxides containing up to four substituents selected from the group consisting of chlorine, bromine and iodine atoms, nitro and cyano groups and alkyl and alkoxy groups said alkyl and alkoxy groups containing up to four carbon atoms.

2. 1 - hydroxy - 1,2,3,4 - tetrahydrophenazine - N,N'-dioxide.

3. 1,4 - dihydroxy - 1,2,3,4 - tetrahydrophenazine - N,N'-dioxide.

4. Epi 1,4-dihydroxy-1,2,3,4-tetrahydrophenazine-N,N'-dioxide.

5. A process for the preparation of a compound selected from the group consisting of substituted and unsubstituted 1-monohydroxylated-, 1,4-dihydroxylated- and epi 1,4-dihydroxylated-1,2,3,4-tetrahydrophenazine-N,N'-dioxides, the substituted dioxides containing up to four substituents selected from the group consisting of chlorine, bromine and iodine atoms, nitro and cyano groups, and alkoxy and alkyl groups, said alkoxy and alkyl groups containing up to four carbon atoms, which process comprises contacting a 1,2,3,4-tetrahydrophenazine with from about 0.5 to about a 2.0 molar proportion of a perorganic acid for at least a day.

6. A process as in claim 5 wherein a 1,2,3,4-tetrahydrophenazine is contacted with from about 0.5 to about a 2.0 molar proportion of a perorganic acid at from about 15° C. to about 65° C. for from about one to about six days.

7. A process as in claim 5 wherein a 1,2,3,4-tetrahydrophenazine is contacted with perorganic acid at from about 15° C. to about 35° C. for from about one to about two-and-one-half days.

8. A process as in claim 5 wherein a 1,2,3,4-tetrahydrophenazine is contacted with a perorganic acid at from about 45° C. to about 65° C. from about three to about six days.

9. A process as in claim 5 wherein the perorganic acid is peracetic acid.

References Cited in the file of this patent

Chemical Abstracts, vol. 41, pp. 6262–6263 (1947).
Nature, vol. 161, p. 1010 (1948).
Pachter et al.: Jour. Am. Chem. Soc., vol. 73, pp. 4958–4959 (1951).
Whitmore: Organic Chemistry, p. 246, second edition (1951).